US007398534B2

(12) United States Patent
Edwards et al.

(10) Patent No.: US 7,398,534 B2
(45) Date of Patent: Jul. 8, 2008

(54) SYSTEM AND METHOD FOR ASSESSING COMPONENT CAPABILITIES

(75) Inventors: Warren Keith Edwards, San Francisco, CA (US); Mark W. Newman, San Francisco, CA (US); Jana Zdislava Sedivy, Palo Alto, CA (US); Trevor Smith, San Francisco, CA (US); Shahram Izadi, Oxon (GB)

(73) Assignee: Palo Alto Research Center Incorporated, Palo Alto, CA (US)

( * ) Notice: Subject to any disclaimer, the term of this patent is extended or adjusted under 35 U.S.C. 154(b) by 669 days.

(21) Appl. No.: 10/324,625

(22) Filed: Dec. 18, 2002

(65) Prior Publication Data

US 2004/0123300 A1 Jun. 24, 2004

(51) Int. Cl.
  G06F 9/44 (2006.01)
  G06F 9/445 (2006.01)
  G06F 9/46 (2006.01)
(52) U.S. Cl. .................. 719/330; 717/174; 717/176; 717/177
(58) Field of Classification Search .......... 717/176, 717/177, 174; 719/330
  See application file for complete search history.

(56) References Cited

U.S. PATENT DOCUMENTS

| 6,219,787 | B1 * | 4/2001 | Brewer .................. 713/167 |
| 6,473,894 | B1 * | 10/2002 | Shrader et al. ............ 717/126 |
| 6,496,979 | B1 * | 12/2002 | Chen et al. .................. 717/178 |
| 6,728,955 | B1 * | 4/2004 | Berry et al. .................. 717/158 |
| 7,054,932 | B2 * | 5/2006 | Herrmann et al. ............ 709/226 |
| 7,089,313 | B2 * | 8/2006 | Lee et al. .................... 709/227 |
| 2002/0026506 | A1 * | 2/2002 | Herrmann et al. ............ 709/223 |
| 2002/0147974 | A1 | 10/2002 | Wookey |
| 2002/0156795 | A1 | 10/2002 | Edwards et al. |
| 2003/0079123 | A1 * | 4/2003 | Mas Ribes .................. 713/156 |
| 2003/0192036 | A1 * | 10/2003 | Karkare et al. ............... 717/158 |
| 2004/0015958 | A1 * | 1/2004 | Veil et al. .................... 717/174 |
| 2004/0015961 | A1 * | 1/2004 | Chefalas et al. ............. 717/178 |

OTHER PUBLICATIONS

U.S. Appl. No. 10/052,585, filed Jan. 23, 2002 by Newman et al., titled "System and Method for Providing Context Information."

(Continued)

*Primary Examiner*—Li B Zhen
(74) *Attorney, Agent, or Firm*—Park, Vaughan & Fleming LLP

(57) ABSTRACT

A system and method for assessing component capability to accept and execute mobile code includes a first component coupled via a network to a second component. The first component uses a predicate object to determine whether the second component can accept mobile code, such as a data type handler object or an applet. The instructions included in the predicate object are executed in the environment of the second component, although they can be executed in the first component environment. The execution of these instructions in the second component environment causes the second component to respond to a series of basic tests, such as whether the second component has access to required libraries, software versions and/or peripherals. Additionally, a predicate object creation module is disclosed for generating predicate objects that are specific to the objects desired, such as a data type handler object or a controller object.

8 Claims, 5 Drawing Sheets

OTHER PUBLICATIONS

U.S. Appl. No. 10/058,268, filed Jan. 29, 2002 by Edwards et al., titled "System and Method for Enabling Arbitrary Components to Transfer Data Between Each Other."

U.S. Appl. No. 10/212,377, filed Aug. 1, 2002 by Edwards et al., titled "System and Method for Enabling Components on Arbitrary Networks to Communicate."

U.S. Appl. No. 10/212,375, filed Aug. 1, 2002 by Edwards et al., titled "Method and System for Handling Data."

U.S. Appl. No. 10/212/376, filed Aug. 1, 2002 by Edwards et al., titled "System and Method for Controlling Communication."

U.S. Appl. No. 10/442,582, filed May 21, 2003 by Edwards et al., titled "System and Method for Dynamically Enabling Components to Implement Data Transfer Security Mechanisms."

U.S. Appl. No. 10/623,296, filed Jul. 18, 2003 by Edwards et al., titled "System and Method for Securely Controlling Communications."

* cited by examiner

SYSTEM AND METHOD FOR ASSESSING COMPONENT CAPABILITIES

FIELD

This invention relates generally to communication methods and systems and, more particularly, to a method and system for assessing a component's capability to accept executable content using one or more predicate objects along with tools for creating these predicate objects.

BACKGROUND

Often in networked settings, components, such as devices, services and/or applications, may desire providing each other with helper applications to assist them in interacting with each other. For instance, Java applets have been used in the World Wide Web to provide Web browsers with additional functionality. An applet is a small, self-contained computer program that usually performs a task as part of, or under the control of, a larger software application. Moreover, applets can be sent along with a Web page to a Web browser. Applets can provide browsers with additional functionality, such as enabling the browsers to display interactive animations and perform immediate calculations or other tasks without having to send a user request back to a server.

The use of such helper applications or transferable programs, such as the applets mentioned above, has helped extend the functionality of components in a variety of settings. On the other hand, increased dependence and use of these applets has created new problems. For instance, sometimes applets can hinder Web page loading or cause the browsers to crash. Heretofore, these transferable programs have been sent indiscriminately to clients, such as Web browsers, without first determining whether their intended recipients have the capability to execute these programs in the first place. Thus, components that do not have sufficient processing power, memory or appropriate supporting software versions are force-fed programs they simply cannot execute. With the advent of devices and services that can communicate in a fluid, ad-hoc manner, the role of transferrable executable programs may continue to increase thereby amplifying the problems noted above.

SUMMARY

A method and computer readable medium in accordance with embodiments of the present invention include creating a predicate object having at least one instruction for performing at least one diagnostic test, determining whether a first component and a second component can participate in an interaction with each other based upon at least one result obtained from at least one of the first and the second components executing the at least one instruction, and initiating the interaction when the determining indicates that the first component and the second component can participate in the interaction.

A system in accordance with embodiments of the present invention includes a diagnostic system that creates a predicate object having at least one instruction for performing at least one diagnostic test. A determination system determines whether a first component and a second component can participate in an interaction with each other based upon at least one result obtained from at least one of the first and the second components executing the at least one instruction. Further, an initiation system initiates the interaction when the determining system's determination indicates that the first component and the second component can participate in the interaction.

A method and computer readable medium in accordance with embodiments of the present invention include executing one or more instructions associated with a first object, monitoring the executing of the one or more instructions, and generating a predicate object that has at least one diagnostic test instruction which when executed by a component indicates to the component what resources the component or at least one other component needs to be able to execute the one or more instructions associated with the first object using information obtained from the monitoring of the executing of the instructions.

A system in accordance with embodiments of the present invention includes an object execution system that executes one or more instructions associated with a first object. A monitoring system monitors the object execution system during the execution of the one or more instructions, and a predicate object generation system generates a predicate object that has at least one diagnostic test instruction which when executed by a component indicates to the component what resources the component or at least one other component needs to be able to execute the one or more instructions associated with the first object using information obtained from the monitoring system.

The present invention provides predicate objects that enable components to preemptively determine whether they can send each other additional set amounts of mobile code for extending a component's functionality. Components can decide whether to send the additional mobile code upon assessing an intended recipient components' capability to accept the additional code. On the other hand, the additional mobile code is not forced upon the intended recipient components that may be assessed as not having the capability to accept it. As a result, components can more reliably and efficiently provide each other with mobile code to extend each other's functionality while reducing the occurrences of system crashes.

DETAILED DESCRIPTION

Figure 1:
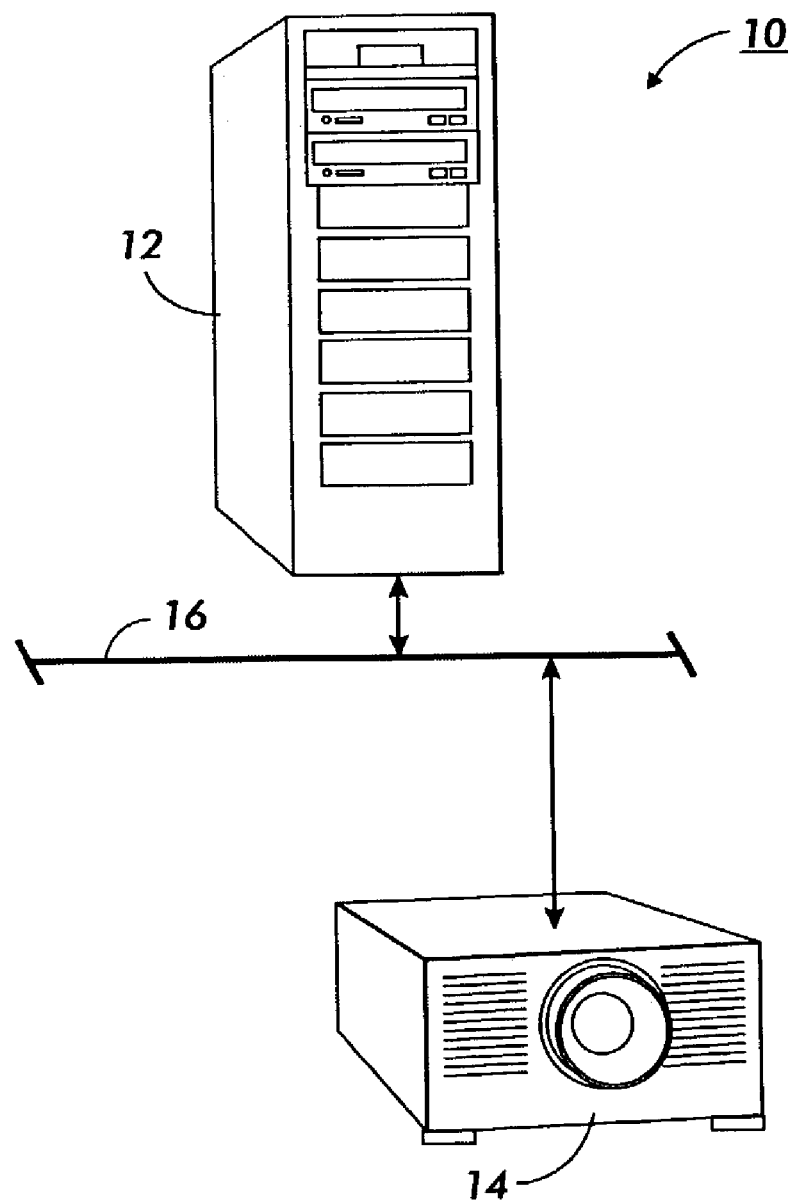
FIG. 1 is a perspective view of a system for assessing component capability in accordance with embodiments of the present invention.
Figure 2:
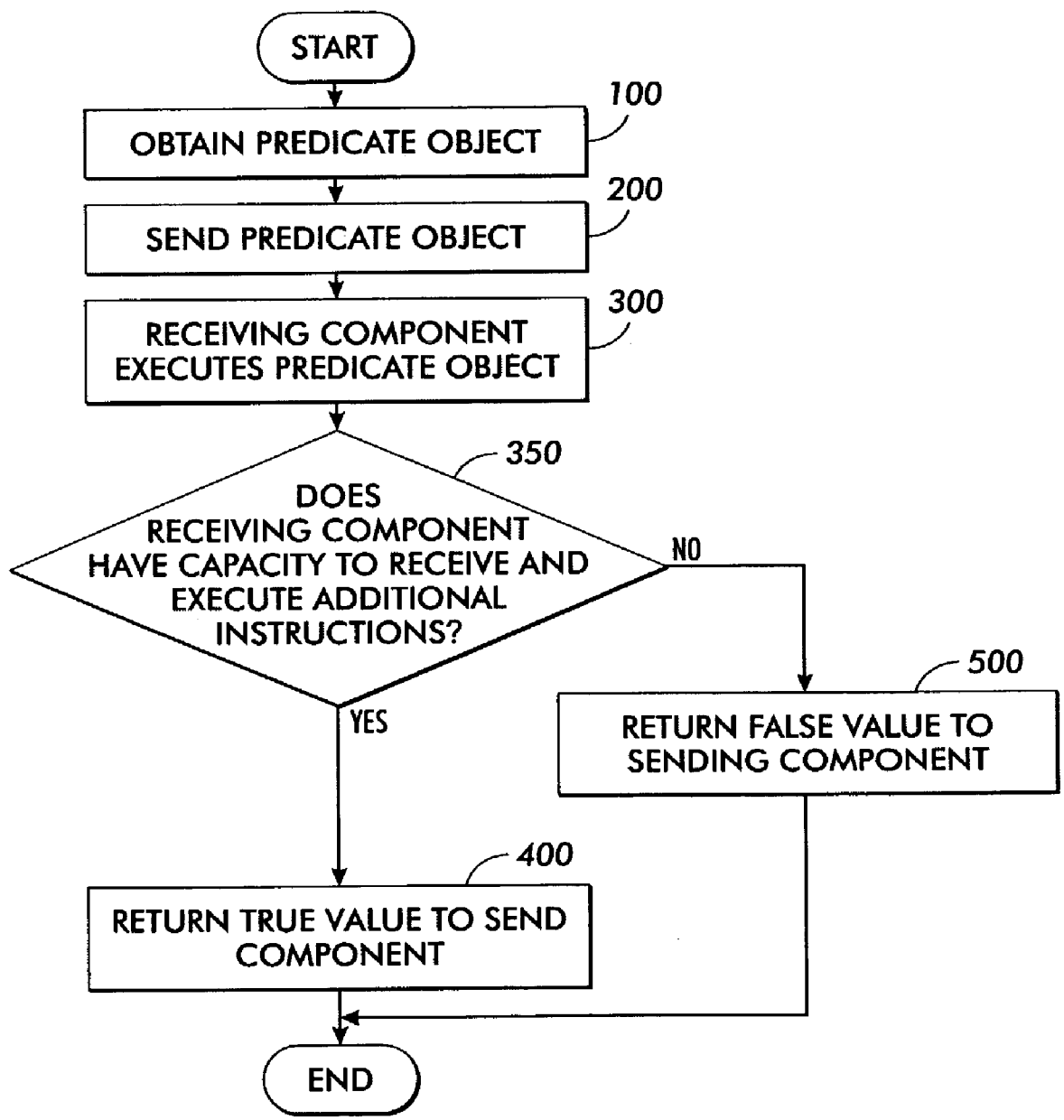
FIG. 2 is a flow chart of a method for assessing component capability in accordance with embodiments of the present invention.

A system 10 and method for assessing component capabilities in accordance with embodiments of the present invention are illustrated in FIGS. 1 and 2. The system 10 includes a server component 12 coupled via a network 16 to a projector component 14. The server component 12 uses a predicate object 22(2) to determine whether the projector component 14 can accept a data type handler object 20(2), although the predicate object may be used to determine whether the component 14 can accept other types of mobile code. The one or more embodiments of the present invention provides predicate objects 22(2) that enable components to preemptively determine whether they can send each other additional set amounts of mobile code for extending a component's functionality. As a result, components can more reliably and efficiently provide each other with mobile code to extend each other's functionality while reducing the occurrences of system crashes.

In embodiments of the present invention, server component 12 performs functions, such as data storage, file management and network 16 routing, although server component 12 could have other functions. Server component 12 includes a processor, an input/output ("I/O") unit and a memory, which are coupled together by one or more bus systems or other communication links, although the server component 12 can comprise other elements in other arrangements. The processor executes at least a portion of the programmed instructions for assessing component capability and/or creating predicate objects in accordance with embodiments of the present invention as described and illustrated herein. These programmed instructions are stored in the memory for execution by the processor.

A variety of different types of devices can be used for the memory, such as a random access memory ("RAM") or a read only memory ("ROM") in the system, or a floppy disk, hard disk, or CD ROM, which is read from and/or written to by a magnetic or optical reading and/or writing system that is coupled to the processor. The memory is used to store these programmed instructions as well as other information, although the instructions may be stored elsewhere. The I/O unit is used by the server component 12 to operatively couple and communicate with other components, such as the projector component 14, over the network 16 using a line based medium such as an Ethernet™, although other types of networks 16 can be used including a wireless network 16, such as Bluetooth™.

Further, the server 12 optionally includes a predicate object creation module 30, which in this example resides in memory in the server component and is implemented by the processor in the server component 12 as will be described further herein below in connection with steps 110-170, although the module 30 may reside in and be implemented by any other component. Moreover, for ease of description and illustration, the server 12 in this embodiment is shown as including the predicate object creation module 30 as mentioned above. In practice, however, such a predicate object creation module 30 will typically be situated at and implemented by another component that usually will not be utilizing the predicate object as described in connection with steps 200-700.

Further, a developer of a component, such as the server 12 in this example, who may create the code which constitutes the type handler object 20(1) or any other object for which a predicate object is to be created, for example, typically may also create the code which constitutes the predicate object(s). Additionally, the predicate object creation module 30 does not necessarily represent specific hardware or software. The module 30 may be hardware and/or software implemented to substantially perform the functions explained herein, although a human operator may perform at least a portion of the functions of the module 30 as described herein. Moreover, the module 30 may be divided into additional sub-modules based upon the function or result desired and/or the particular requirements of the environment it resides in.

The projector component 14 can project images, such as text and/or graphics, onto a fixed medium, such as a projection screen, although the projector component 14 could have other functions. The projector component 14 includes a projection system and a control system with a processor, I/O unit and a memory, which are coupled together by one or more bus systems or other communication links, although the projector component 14 can comprise other elements in other arrangements, such as having the control system external to the projector component 14. The processor executes at least a portion of the programmed instructions for assessing component capability in accordance with embodiments of the present invention as described herein and as set forth in FIGS. 2-4.

These programmed instructions for assessing component capability and/or creating predicate objects are stored in the memory for execution by the processor. A variety of different types of devices can be used for the memory, such as a RAM or a ROM in the system, or a floppy disk, hard disk, or CD ROM which is read from and/or written to by a magnetic or optical reading and/or writing system that is coupled to the processor. The memory can be used to store these programmed instructions as well as other information, although the instructions may be stored elsewhere. The I/O unit is used by the projector component 14 to operatively couple and communicate with other components, such as the server component 12, over the network 16 using a line based medium such as an Ethernet™, although other types of networks 16 can be used including a wireless network 16 such as Bluetooth™.

Components, such as server component 12 and projector component 14, are provided for exemplary purposes only. In embodiments of the present invention, the components may comprise any type of device or system that can store, process and execute instructions for performing one or more methods of the present invention as will be described in further detail herein, although the components may also comprise executable programs or other types of software entities that may be executed by or reside in a memory of a device or system. By way of example only, the components shown in FIG. 1 may also comprise devices, such as scanners, lap-top computers, cellular telephones, display devices, video input/output devices, audio input/output devices, copier devices, printer devices, remote control devices, appliances and file systems or databases residing in a computer system.

The network 16 enables the server component 12 and the projector component 14 to communicate with each other and any other components with access to network 16 at least at a basic level using a TCP/IP protocol, although other protocols may be used. In embodiments of the present invention, the network 16 comprises the Internet, although other types of networks 16 may be used, such as a local area network ("LAN"), a wide area network ("WAN"), a telephone line network, a coaxial cable network, and/or a wireless network.

The operation of the system 10 for assessing component capability in accordance with embodiments of the present invention will now be described with reference to FIGS. 1-4. The term "component" means one or more applications or programs executing on the server component 12 or the projector component 14, such as a slide show program, although components may refer to the actual hardware devices executing those applications. For ease of discussion and illustration, reference will be made generally to the server component 12 and projector component 14 throughout embodiments of the present invention, rather than to the specific applications executing on those machines except where appropriate.

By way of example only, a server component 12 desires presenting slides from a slide show program, such as MS PowerPoint™, using a suitable device, such as the projector component 14. The projector component 14, however, may not be programmed to understand data in an MS PowerPoint™ format. Thus, in this example the server component 12 performs a discovery process to determine which components are present on the network 16 and what their data transfer capabilities are, as disclosed in U.S. patent application Ser. No. 10/058,268 to Edwards et al., titled "SYSTEM AND METHOD FOR ENABLING ARBITRARY COMPONENTS TO TRANSFER DATA BETWEEN EACH OTHER," filed Jan. 29, 2002, which is hereby incorporated by reference in its entirety.

The projector component 14 returns a projector proxy object to the server component 12, which is then stored in the memory of server component 12. The proxy object can provide a list of the data types in which it can receive data. The list is provided in a MIME format, although other formats may be used, such as generic text strings. The proxy object also provides a list of one or more data type handler interfaces associated with the projector component 14 and that the projector 14 may accept and execute. Further, the proxy object also implements one or more universal interfaces associated with the projector component 14, which are accessible to the server component 12, such as a data sink interface, as disclosed in U.S. patent application Ser. No. 09/838,933 filed Apr. 20, 2001 by Edwards et al., titled SYSTEM AND METHOD FOR ENABLING COMMUNICATION AMONG ARBITRARY COMPONENTS.

In embodiments of the present invention, the server component 12 and the projector component 14 each have stored in their respective memories programming to understand the semantics of a basic set of universal interfaces associated with the proxy objects and their associated operations, instructions and data, which will be described in further detail herein. The particular universal interface used is responsive to the needs of applications for particular services, such as printing a file being operated on by a word processing program. However, the basic semantic programming does not need to know the particulars of the specific services involved, only the semantics of the universal interfaces used in embodiments of the present invention as described further herein below.

In embodiments of the present invention, server component 12 has stored in its memory and implements, or otherwise has access to ("associated with"), a data source interface, although the server component 12 may also implement a variety of other interfaces, such as a contextual interface, a notification interface and a user interface, as disclosed in U.S. patent application Ser. No. 10/058,268 to Edwards et al., titled "SYSTEM AND METHOD FOR ENABLING COMMUNICATION AMONG ARBITRARY COMPONENTS," filed Jan. 29, 2002, which has already been incorporated by reference in its entirety. In embodiments of the present invention, the projector component 14 is associated with a data sink interface, although the projector component 14 can also be associated with a variety of other interfaces, in the same manner described above with respect to the server component 12.

The server component 12 inspects the proxy object to determine which data type handler interfaces and can be accepted and understood by the projector component 14. By way of example only, the server component 12 examines the list of data type handler interfaces and data types provided in the proxy object by the projector component 14, described above in connection with step 200. The server component 12 determines that the projector component 14 has been programmed to understand the semantics of a viewer interface. Thus, the projector component 14 may accept, understand and execute mobile code instructions that may be provided by another component, such as server component 12, that implements the viewer interface. Moreover, the server component 12 determines that in addition to the type handler interface "Viewer," the projector component 14 can also understand data provided in a JPEG data type format.

Further in this example, the server component 12 can provide mobile code that implements the viewer interface, and can also provide data in an MS PowerPoint™ data type format. Although a viewer interface is used in this example, the server component 12 can provide, and the projector component 14 can accept and implement, other types of interfaces, such as an editor interface that can modify received data in certain formats, a printer interface that can be used by a component to render a data type on a printer, and a converter interface that changes data from one data type to another.

The server component 12 also determines that the projector component 14 is associated with at least a data sink interface, as described in U.S. application Ser. No. 09/838,933 to Edwards et al., titled "A MECHANISM FOR INTERCONNECTING ARBITRARY DEVICES AND SERVICES OVER A NETWORK," filed Apr. 20, 2001, which is hereby incorporated by reference in its entirety. Thus, the projector component 14 at least has the capability to receive data provided by a component having access to its data sink interface. The server component 12 in this example understands the semantics of data sink interfaces, such as the data sink interface associated with the projector component 14, and thus can invoke the interface to provide the projector 14 with data.

Figure 3:
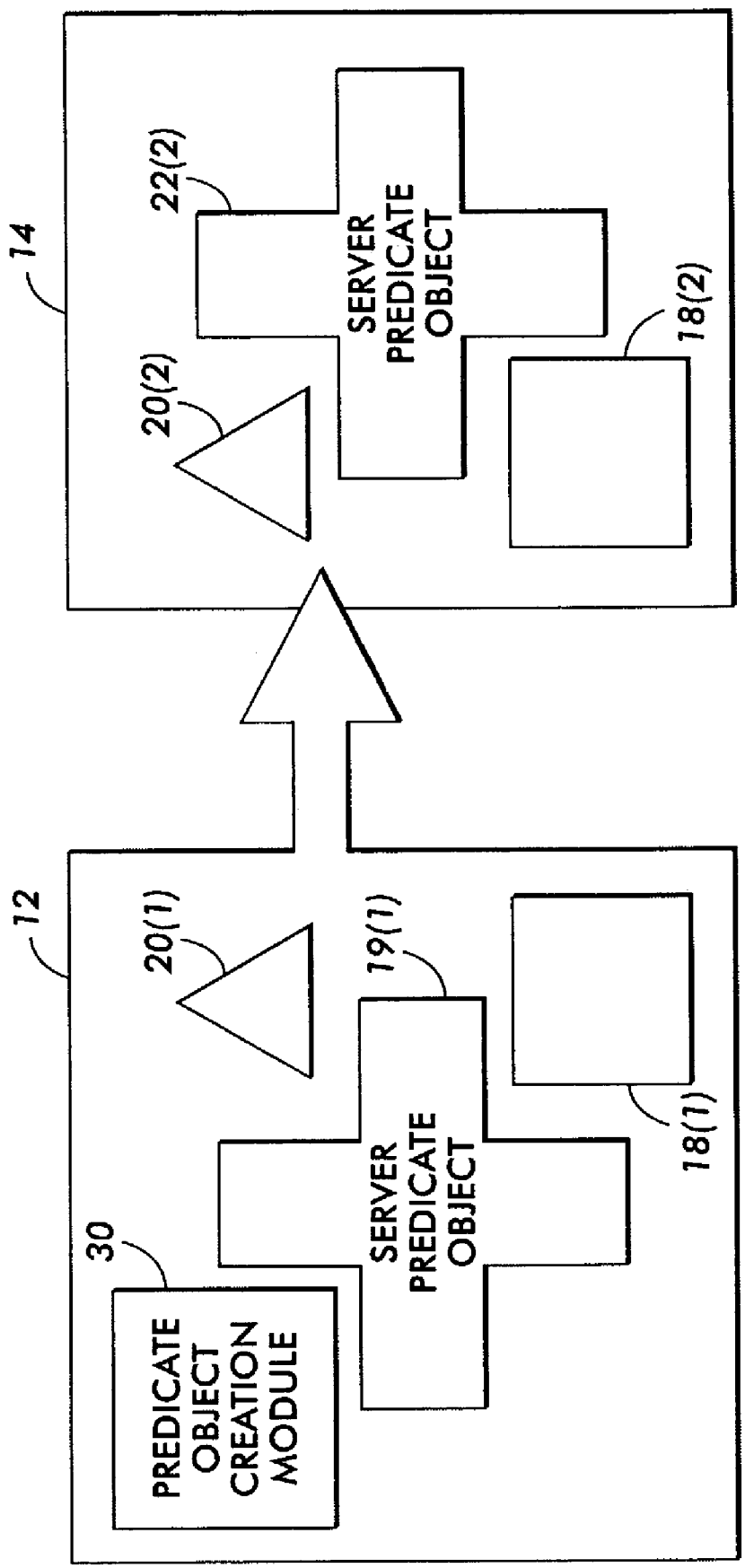
FIGS. 3-4 are functional block diagrams of a method for assessing component capability in accordance with embodiments of the present invention.
Figure 4:
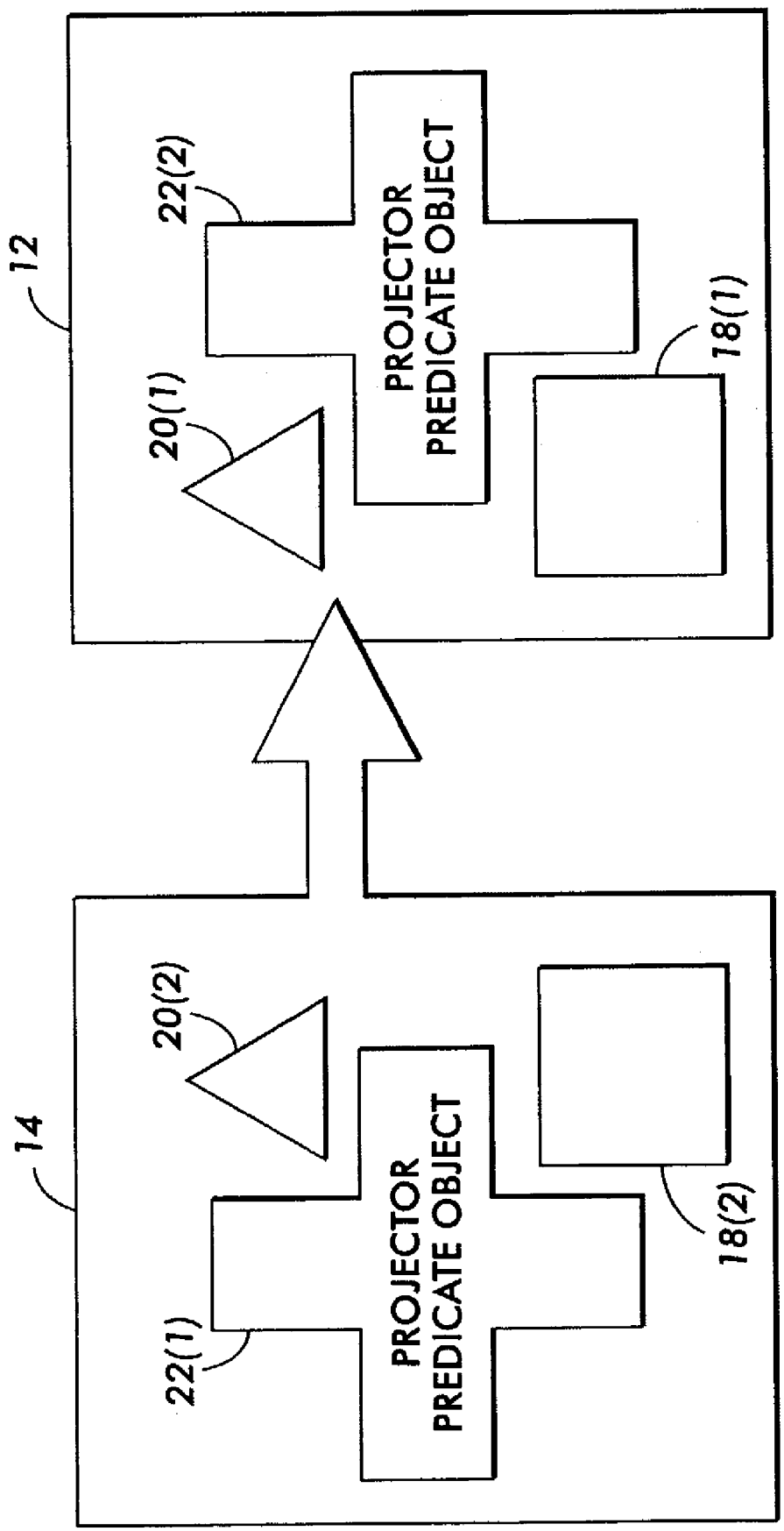

Accordingly and referring to FIGS. 2-3, the server component 12 creates a data transfer session object 18(1) and invokes the data sink interface associated with the projector component 14, passing the session object 18(1) into the interface call. The projector component 14 receives a data transfer session object 18(2) from the server component 12, which is a copy of the data transfer session object 18(1) as shown in FIG. 3. The data transfer session objects 18(2) includes instructions, operations and data that are specific to the server component 12, yet may be understood and executed by the projector component 14.

The projector component 14 executes one or more operations in the session object 18(2) to enable the projector component 14 to retrieve the data from the server component 12. The instructions included in the data transfer session object 18(2) may also include instructions that when executed by the projector component 14 instruct the projector component 14 to request a copy of a data type handler object 20(1) to handle the data, as disclosed in U.S. application Ser. No. 10/212,375 (Attorney Docket Nos. D/A2076 and 1508/3710) to Edwards et al., titled "A METHOD AND SYSTEM FOR HANDLING DATA," filed Aug. 1, 2002, which has already been incorporated by reference in its entirety. Thus, in this example the projector component 14 requests a copy of the data type handler object 20(1).

Referring to FIG. 2, at step 100, the server component 12 responds by obtaining from the server memory a predicate object 22(1), as shown in FIG. 3. In embodiments of the present invention, the predicate object 22(1), its associated operations, instructions and interfaces, as well as any other interfaces, operations and instructions that may be subsequently described herein, comprise programming language instructions, such as JAVA, although other languages may be used, such as Smalltalk, CLOS, Ada or Object Pascal. The language instructions may also comprise mobile code instructions. Mobile code is executable content, such as object oriented code, which can be transmitted to server component 12 or projector component 14 where it is executed as described herein, although other types of programming methodologies may be used, such as procedural-oriented, logic-oriented, rule-oriented, declarative or constraint oriented. Additionally, the predicate object 22(1) language instructions may comprise a subset of a complete programming language, such as Java, although the language may comprise "custom" language instructions specifically designed for expressing predicate objects.

At step 200, the server component 12 sends a copy of the predicate object 22(1) to the projector component 14, which is shown as predicate object 22(2). The object 22(2) is sent using a TCP/IP communication protocol, although other protocols can be used, such as RPC, CORBA, SOAP and RMI. Further, projector component 14 at least has the capability to store in its memory and be able to execute the instructions included in the predicate object 22(2) as described herein.

At step 300, the instructions included in the predicate object 22(2) are executed in the environment of the projector component 14. The projector component 14 determines whether it has the capability to receive and execute data type handler object 20(2), which is a copy of data type handler object 20(1). The execution of these instructions cause the projector component 14 to respond to a series of basic tests, such as whether the projector component 14 has access to libraries or versions thereof that the projector component 14 will need to execute the handler object 20(2), as well as whether the projector component 14 can access required software versions and/or peripherals or have sufficient hardware or memory capacity. Moreover, the projector component 14 may respond to additional tests, such as whether the projector component 14 has the computational capability or any other required capabilities to execute the object 20(2).

At decision box 350, if the projector component 14 performs step 300 as described above and determines that it does has the capability to accept and execute a copy of the data type handler object 20(1), then the YES branch is followed.

At step 400, the projector component 14 responds back to the server component 12 with a "TRUE" value. Therefore, the projector component 14 can accept and execute additional mobile code in the form of a copy of the data type handler object 20(1) for handling the data transferred during a data transfer.

Accordingly, the projector component 14 obtains data type handler object 20(2), which is associated with the data transfer session object 18(2) and is thus accessible to the projector component 14, although the projector component 14 could obtain the data type handler object 20(2) from other sources, such as another component coupled to the network 16 or from memory in the projector component 14. The data type handler objects 20(1)-20(2) are expressed in the data transfer session object 18(2) as tuples in the format "[native data type, interface]". In this example, the data transfer session object 18(2) may include the tuple "[application/powerpoint, com.PARC.Viewer]," which indicates that the data type handler objects 20(1)-20(2) provide a specific implementation of the viewer interface that can be executed to view MS PowerPoint™ files.

The viewer interface that is accessible to the projector component 14 through the data type handler object 20(2) includes data type handling instructions that enable the projector component 14 to handle data types that are not native to the projector component 14 during the data transfer, as disclosed in U.S. application Ser. No. 10/212,375 (Attorney Docket Nos. D/A2076 and 1508/3710) to Edwards et al., titled "A METHOD AND SYSTEM FOR HANDLING DATA," filed Aug. 1, 2002, which has already been incorporated by reference in its entirety. In this example, the projector component 14 begins receiving the MS PowerPoint™ data from the server component 12 and can handle the data.

At decision box 350, if the projector component 14 does not include or have access to one or more of the required capabilities, then the NO branch is followed. At step 500, the projector component 14 reports back to the server component 12 that it cannot accept additional mobile code for implementing in the form of the handler object 20(2). In this case, the projector component 14 returns a "FALSE" value back to the server component 12, which is sent back to the server component 12 using a TCP/IP communication protocol, although other protocols can be used, such as RPC, CORBA, SOAP and RMI. Thus, the server component 12 does not send a copy of the handler object 20(2) to the projector component 14, and the process ends.

Other embodiments of a method for assessing component capabilities will now be described. Steps 100-500 are performed in the same manner described above, except at steps 100-200, the projector component 14 obtains and sends a copy of a predicate object 22(1), shown as predicate object 22(2), to the server component 12.

Further, at step 300, the server component 12 executes the predicate object 22(2) to determine whether the projector component 14 has the capabilities to receive, store and execute a copy of the data type handler object 20(1) that the server component 12 can provide.

In this example, at decision box 350, the server component 12 executes the predicate object 22(2) passed to it by projector 14. This predicate object 22(2) inspects the data type handler object 20(1) that the server can potentially provide to projector component 14, and if the projector 14 can receive the handler object 20(1), the YES branch is followed. At step 400 in this example, the predicate object 22(2) returns a value of "TRUE", and thus the server component 12 knows that the projector 14 can receive and accept a copy of the data type handler object 20(2) from the server component 12. Accordingly, the projector 14 obtains the data type handler object 20(2) and handles the data as described above in connection with embodiments of the present invention.

A method for creating predicate objects in accordance with embodiments of the present invention will now be described in connection with FIG. 5 and with reference back to FIGS. 1-4. Referring back to FIGS. 2-3 and step 100, before the server 12 obtains the predicate object 22(1) from the server memory as described above, the predicate object creation module 30 creates the predicate object 22(1) as described herein below in connection with steps 110-170, although the module 30 may also create the object 22(1) at step 100.

Figure 5:
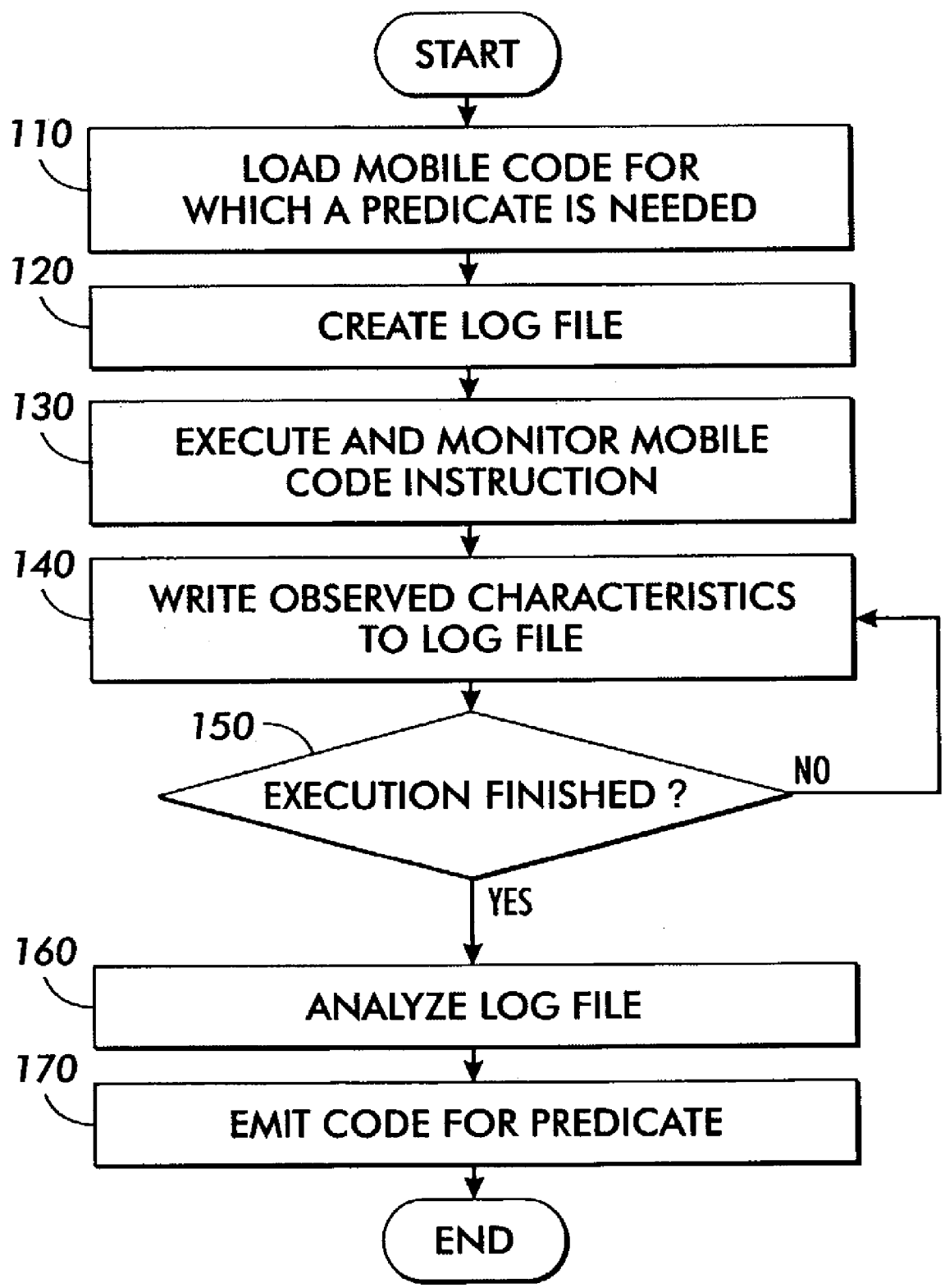
FIG. 5 is a flow chart of a method for creating predicate objects in accordance with embodiments of the present invention.

Accordingly, referring to FIG. 5 at step 110, the predicate object creation module 30 loads into memory the code which constitutes the data type handler object 20(1) for which a predicate object is to be created, although the module 30 may load a controller object or any other type of application, such as an applet, into its memory to create a predicate object for.

At step 120, the predicate object creation module 30 creates a log file to be stored in the memory, which will include one or more characteristics the module 30 observes during execution of the data type handler object 20(1), as will be discussed further herein in connection with step 140.

At step 130, the predicate object creation module 30 executes a line of code included in the data type handler object 20(1) and monitors the behavior of the object 20(1) execution. Some of these behaviors and requirements include the amount of memory the data type handler object 20(1) requires to execute, which external libraries are needed for the data type handler object 20(1) to properly execute, and what hardware resources the data type handler object 20(1) requires access to in order to execute properly.

At step 140, as each line of code is executed as described above in connection with step 130, the characteristics observed by the predicate object creation module 30 are written to the log file created earlier as described above in connection with step 120. For instance, if the module 30 observes that execution of a line of code resulted in the object 20(1) loading, or attempting to load, an external file, then the module 30 will indicate so in the log file. Further, the module 30 is configured to place an indication in the log file, such as "FILE REQUEST: <filename>", for further processing as described herein. Additionally, the module 30 writes additional information about the object 20(1) into the log file that is not necessarily obtained during execution of the object, such as the amount of memory space required to be able to initially load the object 20(1) into memory before beginning execution.

At decision box 150, the predicate object creation module 30 examines the data type handler object 20(1) to determine whether the module 30 has completed executing the object 20(1). If the module 30 determines that the data type handler object 20(1) execution has not completed yet, then the NO branch is followed, and steps 130-150 are repeated until the module has completed executing all of the lines of code in the object 20(1). Once the module 30 determines that all the code in the object 20(1) has been executed, the YES branch is followed.

At step 160, the predicate object creation module 30 analyzes the log file created above, as described in connection with steps 120-150, to determine what resources a component, such as server 12 or projector 14, will need to be able to execute the data type handler object 20(1). For instance, the module 30 is configured to examine the indications included in the log file at step 140, such as the "FILE REQUEST: <filename>" indication, to conclude that in order to execute the predicate object 20(1) a component will at some point need to have access to a file "<filename>".

At step 170, the predicate object creation module 30 uses the information extracted from the log file at step 160 and emits the code that constitutes the predicate object 22(1), which is stored in the server 12 memory for further processing as described herein in accordance with embodiments of the present invention. For instance, as mentioned above the module 30 at step 160 determines that executing the object 20(1) will require access to a file "<filename>", and thus the module 30 will generate a mobile code instruction which when executed by a component will cause the component to request the file "<filename>". Steps 160-170 are repeated until the module has examined all of the indications included in the log file and the code for the predicate object has been generated. Thus, the emitted code captures the requirements of the data type handler object 20(1) as determined by the module 30, described above in connection with step 140.

The predicate objects as described herein in connection with embodiments of the present invention enable components to preemptively determine whether they can provide each other with additional set amounts of mobile code for extending a component's functionality, such as data handler objects. Components can decide whether to send the additional mobile code upon assessing an intended recipient components' capability to accept the additional code. On the other hand, the additional mobile code is not forced upon the intended recipient components that may be assessed as not having the capability to accept it. As a result, components can more reliably and efficiently provide each other with mobile code to extend each other's functionality while reducing the occurrences of system crashes.

Furthermore, while data type handlers have been described above in connection with embodiments of the present invention, predicate objects may be used to determine whether components can accept other types of mobile code for extending a component's functionality, including controller objects, as disclosed in U.S. application Ser. No. 10/212,376 (Attorney Docket Nos. D/A2077 and 1508/3720) to Edwards et al., titled "SYSTEM AND METHOD FOR CONTROLLING COMMUNICATION," filed Aug. 1, 2002, which has already been incorporated by reference in its entirety, data transfer session objects, as disclosed in U.S. patent application Ser. No. 10/058,268 to Edwards et al., titled "SYSTEM AND METHOD FOR ENABLING ARBITRARY COMPONENTS TO TRANSFER DATA BETWEEN EACH OTHER," filed Jan. 29, 2002, which has also already been incorporated by reference in its entirety, and Java applets.

While particular embodiments have been described above, alternatives, modifications, variations, improvements, and substantial equivalents that are or may be presently unforeseen may arise to applicants or others skilled in the art. Accordingly, the appended claims as filed, and as they may be amended, are intended to embrace all such alternatives, modifications, variations, improvements, and substantial equivalents. Further, the recited order of processing elements or sequences, or the use of numbers, letters, or other designations therefor, is not intended to limit the claimed processes to any order except as may be specified in the claims.

What is claimed is:

1. A method comprising:
   creating a predicate object containing at least one instruction for performing at least one diagnostic test, wherein the at least one instruction for performing the at least one diagnostic test is generated based on a monitoring of the execution of one or more instructions associated with a first object for which the predicate object is to be created;
   sending the predicate object to a second component, wherein the second component is a peripheral device with limited resources;
   receiving the predicate object at the second component;
   determining whether a first component and the second component can participate in an interaction with each other based upon at least one result obtained from the second component executing the at least one instruction of the at least one diagnostic test included in the predicate object received at the second component, wherein the diagnostic test determines if the second component possesses the resources to participate in the interaction, wherein the determining further comprises:
      determining whether the second component can execute at least one of a data type handler object and a controller object associated with the first component; and
      sending at least one of the data type handler object and the controller object to the second component when the determining indicates that the second component can execute at least one of the data type handler object and the controller object; and
   initiating the interaction when the determining indicates that the first component and the second component can participate in the interaction; and
   not initiating the interaction when the determining indicates that the first component and the second component cannot participate in the interaction.

2. The method as set forth in claim 1 wherein the determining whether the first component and the second component can participate in an interaction with each other further comprises:
   determining whether the second component can execute at least one mobile code instruction associated with the first component; and sending the at least one mobile code instruction to the second component when the determining indicates that the second component can execute the at least one mobile code instruction.

3. The method as set forth in claim 1 wherein the predicate object further comprises mobile code.

4. A computer memory having stored thereon instructions, which when executed by at least one processor, causes the processor to perform:

creating a predicate object containing at least one instruction for performing at least one diagnostic test, wherein the at least one instruction for performing the at least one diagnostic test is generated based on a monitoring of the execution of one or more instructions associated with a first object for which the predicate object is to be created;

sending the predicate object to a second component, wherein the second component is a peripheral device with limited resources;

receiving the predicate object at the second component;

determining whether a first component and the second component can participate in an interaction with each other based upon at least one result obtained from the second component executing the at least one instruction of the at least one diagnostic test included in the predicate object received at the second object, wherein the diagnostic test determines if the second component possesses the resources to participate in the interaction, wherein the determining further comprises:

determining whether the second component can execute at least one of a data type handler object and a controller object associated with the first component; and sending at least one of the data type handler object and the controller object to the second component when the determining indicates that the second component can execute the data type handler object; and initiating the interaction when the determining indicates that the first component and the second component can participate in the interaction; and not initiating the interaction when the determining indicates that the first component and the second component cannot participate in the interaction.

5. The medium as set forth in claim 4 wherein the determining indicates whether the first component and the second component are able to participate in an interaction with each other further comprises:

determining whether the second component can execute at least one mobile code instruction associated with the first component; and sending the at least one mobile code instruction to the second component when the determining indicates that the second component can execute the at least one mobile code instruction.

6. The medium as set forth in claim 4 wherein the predicate object further comprises mobile code.

7. A system comprising:

a predicate object creation system that creates a predicate object containing at least one instruction for performing at least one diagnostic test, wherein the at least one instruction for performing the at least one diagnostic test is generated based on a monitoring of the execution of one or more instructions associated with a first object for which the predicate object is to be created;

a sending system that sends the predicate object to a second component, wherein the second component is a peripheral device with limited resources;

a receiving system that receives the predicate object at the second component;

a determination system that determines whether a first component and the second component can participate in an interaction with each other based upon at least one result obtained from the second component executing the at least one instruction of the at least one diagnostic test included in the predicate object, wherein the diagnostic test determines if the second component possesses the resources to participate in the interaction, and wherein the first component and the second component are separate hardware devices coupled together by a network, wherein the interaction comprises receiving at the second component at least one of a data type handler object and a controller object associated with the first component, the first component sending the at least one of the data type handler object and the controller object to the second component when the determining indicates that the second component can execute the at least one of the data type handler object and the controller object; and an initiation system that initiates the interaction when the determining indicates that the first component and the second component can participate in the interaction; and that does not initiate the interaction when the determining indicates that the first component and the second component cannot participate in the interaction.

8. The system as set forth in claim 7 wherein the predicate object further comprises mobile code.

* * * * *